(12) United States Patent
Powell et al.

(10) Patent No.: US 6,282,290 B1
(45) Date of Patent: *Aug. 28, 2001

(54) HIGH SPEED MODULAR EXPONENTIATOR

(75) Inventors: Gregory Alan Powell, Redondo Beach, CA (US); Mark William Wilson, Ellicott City, MD (US); Kevin Quoc Truong, Rosemead; Christopher Peter Curren, Santa Monica, both of CA (US)

(73) Assignee: Mykotronx, Inc., Torrance, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/828,368

(22) Filed: Mar. 28, 1997

(51) Int. Cl.$^7$ .................................................... H04K 9/28
(52) U.S. Cl. .......................... 380/28; 380/285; 380/260; 380/44; 380/45; 380/30; 708/808; 708/851; 713/200; 713/491
(58) Field of Search ................................ 380/28, 44, 30, 380/59, 285, 46, 47; 708/3, 135, 801, 808, 851; 713/200

(56) References Cited

U.S. PATENT DOCUMENTS

| 4,200,770 | 4/1980 | Hellman et al. | 380/21 |
| 5,400,403 | 3/1995 | Fahn et al. | 380/21 |

OTHER PUBLICATIONS

Quisquater et al., Fast Decipherment for RSA Public–Key Cryptosystem, Oct. 14, 1982, Electronic Letters, vol. 18, No. 21, pp. 905–907.*

Menezes et al., Handbook of Applied Cryptography, 1996, pp. 613–627.*

Schneier, Applied Cryptography, Second Edition, 1995, pp. 242–245, 249, 250, and 466–470, Oct. 1982.*

MicroSentinelUX™, Securing the future of software—Developer's Guide, Rainbow Technologies, Irvine, CA 92718, 1992; 107 pages.

Comba, P.G., "Exponentiation Cryptosystems on the IBM PC", IBM Systems Journal, vol. 29, No. 4, Jan. 1, 1990, pp. 526–538.

Bond, Dieter et al., "Optimized Software Implementations of the Modular Exponentiation on General Purpose Microprocessors", Computers & Security Journal, vol. 8, No. 7, Nov. 1, 1989, pp. 621–630.

Quisquater, J.J. et al., "Fast Decipherment Algorithm for RSA Public–Key Cryptosystem", Electronics Letters, vol. 18, No. 21, Oct. 14, 1982, pp. 905–907.

Copy of European Search Report for related European Patent Application No. 98 301 533.0.

(List continued on next page.)

Primary Examiner—Tod Swann
Assistant Examiner—Paul E. Callahan
(74) Attorney, Agent, or Firm—Foley & Lardner

(57) ABSTRACT

A modular exponentiator is adapted to receive a first communicated signal and derive a second signal therefrom by computation of a modular exponentiation of the form $b^e$ mod n based on the first signal. The modular exponentiator divides the modular exponentiation according to the Chinese remainder theorem into first and second portions respectively having modulus values p and q of approximately half of an original modulus value n of the modular exponentiation. Each portion of the modular exponentiation is factored into respective pluralities of smaller modular exponentiations having precalculated exponent values. The respective pluralities of smaller modular exponentiations are then multiplied together to provide respective intermediate products. The intermediate products are then recombined to yield the modular exponentiation result.

44 Claims, 7 Drawing Sheets

OTHER PUBLICATIONS

Victor, An Efficient RSA Hardware Implementation, by Orup et al., Lecture Notes In Computer Science (Advances In Cryptology–Eurocrypt '90), Springer– Verlag, 1991, pp. 245–252.

Fast Implementation Of RSA Cryptography, by Shand et al., 11th Symposium On Computer Arithmetic, IEEE, pp. 252–259.

Analyzing And Comparing Montgomery Multiplication Algorithms, by Koc et al., IEEE Micro, Jun. 1996, pp. 26–33.

* cited by examiner

| SHIFT NO. | WINDOW VALUE | NET EXPONENTIATION VALUE |
|---|---|---|
| 0 | <u>10</u>11010011 | $b^5$ |
| 1 | 1<u>01</u>1010011 | $(b^5)^2$ |
| 2 | 10<u>11</u>010011 | $((b^5)^2)^2$ |
| 3 | 101<u>10</u>10011 | $((((b^5)^2)^2)^2)*b^5$ |
| 4 | 1011<u>01</u>0011 | $(((((b^5)^2)^2)^2)*b^5)^2$ |
| 5 | 10110<u>10</u>011 | $((((((b^5)^2)^2)^2)*b^5)^2)^2$ |
| 6 | 101101<u>00</u>11 | $(((((((b^5)^2)^2)^2)*b^5)^2)^2)^2$ |
| 7 | 1011010<u>011</u> | $(((((((b^5)^2)^2)^2)*b^5)^2)^2)^2*b^3$ |

FIG. 9

| MAJOR LOOP ITERATION | MAJOR LOOP | COMPONENTS | PARTIAL PRODUCTS |
|---|---|---|---|
| 1 | 1 | $a_1b_1$<br>$a_1b_2$<br>$a_1b_3$<br>$a_1b_4$ | $c_1 = a_1b_1 \bmod(2^x)$<br>$c_2 = a_1b_2 + \text{carry} \bmod(2^x)$<br>$c_3 = a_1b_3 + \text{carry} \bmod(2^x)$<br>$c_4 = a_1b_4 + \text{carry} \bmod(2^x)$<br>$c_5 = \text{carry} \bmod(2^x)$ |
|  | 2 | – | $c_1 = a_1b_2 + \Sigma \bmod(2^x)$<br>$c_2 = a_1b_3 + \Sigma \bmod(2^x)$<br>$c_3 = a_1b_4 + \Sigma \bmod(2^x)$<br>$c_4 = \Sigma \bmod(2^x)$<br>$c_5 = \text{carry} \bmod(2^x)$ |
| 2 | 1 | $a_2b_1$<br>$a_2b_2$<br>$a_2b_3$<br>$a_2b_4$ | $c_1 = a_2b_1 + a_1b_2 + \Sigma \bmod(2^x)$<br>$c_2 = a_2b_2 + a_1b_3 + \Sigma \bmod(2^x)$<br>$c_3 = a_2b_3 + a_1b_4 + \Sigma \bmod(2^x)$<br>$c_4 = a_2b_4 + \Sigma \bmod(2^x)$<br>$c_5 = \text{carry} + \Sigma \bmod(2^x)$ |
|  | 2 | – | $c_1 = a_2b_2 + a_1b_3 + \Sigma \bmod(2^x)$<br>$c_2 = a_2b_3 + a_1b_4 + \Sigma \bmod(2^x)$<br>$c_3 = a_2b_4 + \Sigma \bmod(2^x)$<br>$c_4 = \Sigma \bmod(2^x)$<br>$c_5 = \text{carry} \bmod(2^x)$ |
| 3 | 1 | $a_3b_1$<br>$a_3b_2$<br>$a_3b_3$<br>$a_3b_4$ | $c_1 = a_3b_1 + a_2b_2 + a_1b_3 + \Sigma \bmod(2^x)$<br>$c_2 = a_3b_2 + a_2b_3 + a_1b_4 + \Sigma \bmod(2^x)$<br>$c_3 = a_3b_3 + a_2b_4 + \Sigma \bmod(2^x)$<br>$c_4 = a_3b_4 + \Sigma \bmod(2^x)$<br>$c_5 = \text{carry} \bmod(2^x)$ |
|  | 2 | – | $c_1 = a_3b_2 + a_2b_3 + a_1b_4 + \Sigma \bmod(2^x)$<br>$c_2 = a_3b_3 + a_2b_4 + \Sigma \bmod(2^x)$<br>$c_3 = a_3b_4 + \Sigma \bmod(2^x)$<br>$c_4 = \Sigma \bmod(2^x)$<br>$c_5 = \text{carry} \bmod(2^x)$ |
| 4 | 1 | $a_4b_1$<br>$a_4b_2$<br>$a_4b_3$<br>$a_4b_4$ | $c_1 = a_4b_1 + a_3b_2 + a_2b_3 + a_1b_4 + \Sigma \bmod(2^x)$<br>$c_2 = a_4b_2 + a_3b_3 + a_2b_4 \Sigma \bmod(2^x)$<br>$c_3 = a_4b_3 + a_3b_4 + \Sigma \bmod(2^x)$<br>$c_4 = a_4b_4 + \Sigma \bmod(2^x)$<br>$c_5 = \text{carry} \bmod(2^x)$ |

HIGH SPEED MODULAR EXPONENTIATOR

BACKGROUND OF THE INVENTION

1. Field of the Invention

The present invention relates to cryptographic systems, and more particularly, to a highly efficient modular exponentiator for performing modular reduction operations integral to cryptographic key calculations.

2. Description of Related Art

Cryptographic systems are commonly used to restrict unauthorized access to messages communicated over otherwise insecure channels. In general, cryptographic systems use a unique key, such as a series of numbers, to control an algorithm used to encrypt a message before it is transmitted over an insecure communication channel to a receiver. The receiver must have access to the same key in order to decode the encrypted message. Thus, it is essential that the key be communicated in advance by the sender to the receiver over a secure channel in order to maintain the security of the cryptographic system; however, secure communication of the key is hampered by the unavailability and expense of secure communication channels. Moreover, the spontaneity of most business communications is impeded by the need to communicate the key in advance.

In view of the difficulty and inconvenience of communicating the key over a secure channel, so-called public key cryptographic systems are proposed in which a key may be communicated over an insecure channel without jeopardizing the security of the system. A public key cryptographic system utilizes a pair of keys in which one is publicly communicated, i.e., the public key, and the other is kept secret by the receiver, i.e., the private key. While the private key is mathematically related to the public key, it is practically impossible to derive the private key from the public key alone. In this way, the public key is used to encrypt a message, and the private key is used to decrypt the message.

Such cryptographic systems often require computation of modular exponentiations of the form $y = b^e \bmod n$, in which the base b, exponent e and modulus n are extremely large numbers, e.g., having a length of 1,024 binary digits or bits. If, for example, the exponent e were transmitted as a public key, and the base b and modulus n were known to the receiver in advance, a private key y could be derived by computing the modular exponentiation. It would require such a extremely large amount of computing power and time to factor the private key y from the exponent e without knowledge of the base b and modulus n, that unauthorized access to the decrypted message is virtually precluded as a practical matter.

A drawback of such cryptographic systems is that calculation of the modular exponentiation remains a daunting mathematical task even to an authorized receiver using a high speed computer. With the prevalence of public computer networks used to transmit confidential data for personal, business and governmental purposes, it is anticipated that most computer users will want cryptographic systems to control access to their data. Despite the increased security, the difficulty of the modular exponentiation calculation will substantially drain computer resources and degrade data throughput rates, and thus represents a major impediment to the widespread adoption of commercial cryptographic systems.

Accordingly, a critical need exists for a high speed modular exponentiation method and apparatus to provide a sufficient level of communication security while minimizing the impact to computer system performance and data throughput rates.

SUMMARY OF THE INVENTION

In accordance with the teachings of the present invention, a highly efficient modular exponentiator for a cryptographic system is provided.

The cryptographic system comprises a processing unit having a modular exponentiator that is adapted to receive a first communicated signal and derive a second signal therefrom by computation of a modular exponentiation of the form $b^e \bmod n$ based on the first signal. The modular exponentiator divides the modular exponentiation into first and second portions respectively having a modulus value of approximately half of an original modulus value n of the modular exponentiation. Each portion of the modular exponentiation is factored into respective pluralities of smaller modular exponentiations having precalculated exponent values. The respective pluralities of smaller modular exponentiations are then calculated and recombined together.

Particularly, the modular exponentiation is divided into portions in accordance with the Chinese remainder theorem, in which the first portion of the modular exponentiation comprises a component $b^{e_p} \bmod p$ and the second portion of the modular exponentiation comprises a component $b^{e_q} \bmod q$ in which p and q are prime numbers having a product equal to n. The exponents $e_p$ and $e_q$ of the modular exponentiation portions relate to the original exponent e as $e \bmod (p-1)$ and $e \bmod (q-1)$, respectively. The exponents $e_p$ and $e_q$ are factored by use of an exponent bit-scanning technique in which the exponent is loaded into a register having a shiftable window of a size substantially less than the corresponding size of the register. In the exponent bit-scanning technique, a pre-computed value is selected which comprises the base b raised to a selected power equivalent to a portion of the exponent e read through the window. The pre-computed value is squared a number of times corresponding to successive bit shifts of the window relative to the exponent e. The multiplying operation utilizes a Montgomery multiplication process having a speed-up routine for squaring operations.

A more complete understanding of the high speed modular exponentiator will be afforded to those skilled in the art, as well as a realization of additional advantages and objects thereof, by a consideration of the following detailed description of the preferred embodiment. Reference will be made to the appended sheets of drawings which will first be described briefly.

BRIEF DESCRIPTION OF THE DRAWINGS

FIG. 9 is a chart showing an exemplary multiplication and squaring operation in accordance with the flow charts of FIGS. 6 and 7.

DETAILED DESCRIPTION OF THE PREFERRED EMBODIMENT

The present invention satisfies the need for a high speed modular exponentiation method and apparatus which provides a sufficient level of communication security while minimizing the impact to computer system performance and data throughput rates.

In the detailed description that follows, like element numerals are used to describe like elements in one or more of the figures.

Figure 1:
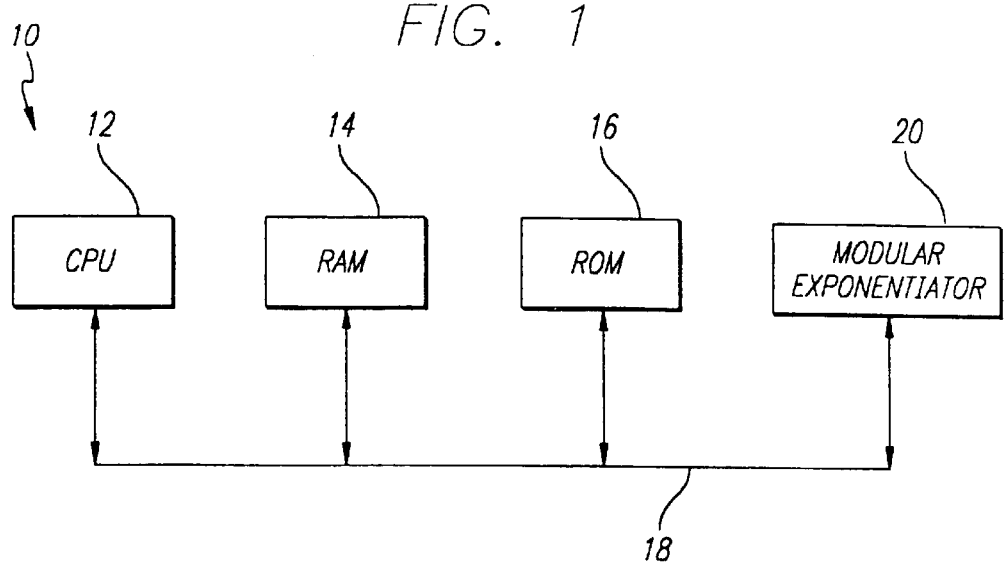
FIG. 1 is a block diagram of an exemplary application of a modular exponentiator within a cryptographic system.

Referring first to FIG. 1, a block diagram of an application of a modular exponentiator 20 within an exemplary cryptographic system 10 is illustrated. The exemplary cryptographic system 10 includes a central processing unit (CPU) 12, a random access memory (RAM) 14, a read only memory (ROM) 16, and modular exponentiator 20. Each of the elements of the cryptographic system 10 are coupled together by a bi-directional data and control bus 18, over which data and control messages are transmitted. The CPU 12 controls the operation of the cryptographic system 10, and may be provided by a conventional microprocessor or digital signal processor circuit. The RAM 14 provides temporary data storage for operation of the CPU 12, and the ROM 16 provides for non-volatile storage of an instruction set, i.e., software, that is executed in a sequential manner by the CPU 12 to control the overall operation of the cryptographic system 10. The modular exponentiator 20 may comprise a special function device, such as an application specific integrated circuit (ASIC) or field programmable gate array (FPGA), that is accessed by the CPU 12 to perform modular exponentiation operations. Alternatively, the elements of the cryptographic system 10 may all be contained within a single ASIC or FPGA in which the modular exponentiator 20 is provided as an embedded core process.

As known in the art, the cryptographic system provides an interface between a non-secure communication channel and a data user. The cryptographic system receives encrypted data from an external source, such as a remote transmitter (not shown) which is communicating with the cryptographic system over the communication channel. The encrypted data is decrypted by the cryptographic system, and the decrypted data is provided to the data user. Conversely, the data user provides decrypted data to the cryptographic system for encryption and subsequent transmission across the communication channel. The cryptographic system also receives and transmits various non-encrypted messages, such as control data and the public key information. It should be apparent that all communications with the cryptographic system occur via the data and control bus 18.

Figure 2:
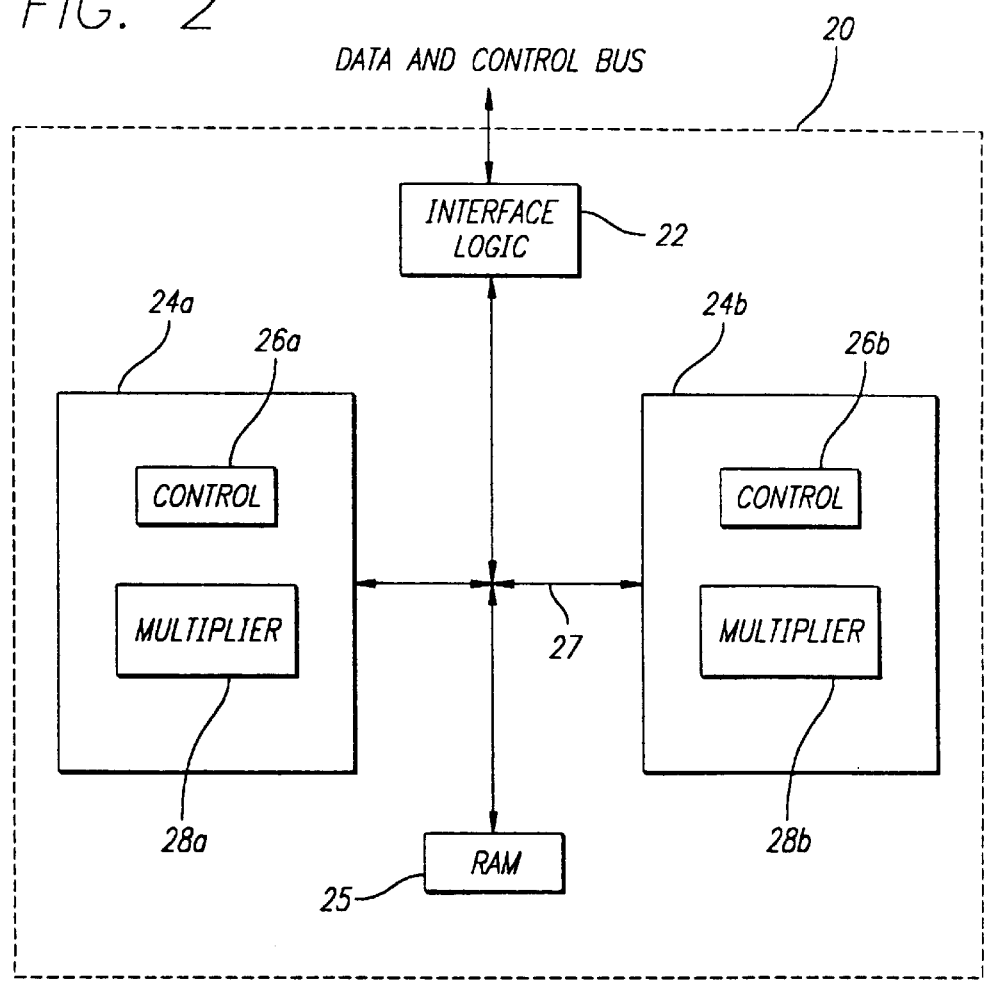
FIG. 2 is a block diagram of the modular exponentiator.

The modular exponentiator 20 is illustrated in greater detail in FIG. 2. The modular exponentiator 20 comprises an interface logic unit 22, a pair of parallel processing units 24a, 24b, and a RAM 25, which all communicate internally over a data and control bus 27. The interface logic unit 22 controls communications between the modular exponentiator 20 and the data and control bus 18 of the cryptographic system 10 described above. The processing units 24a, 24b comprise respective control units 26a, 26b and multiplier units 28a, 28b, which further comprise internal circuit elements that execute a modular exponentiation process, as will be further described below. The RAM 25 provides for temporary storage of data values generated by the control units 26a, 26b and multiplier units 28a, 28b while executing a modular exponentiation operation.

Figure 3:
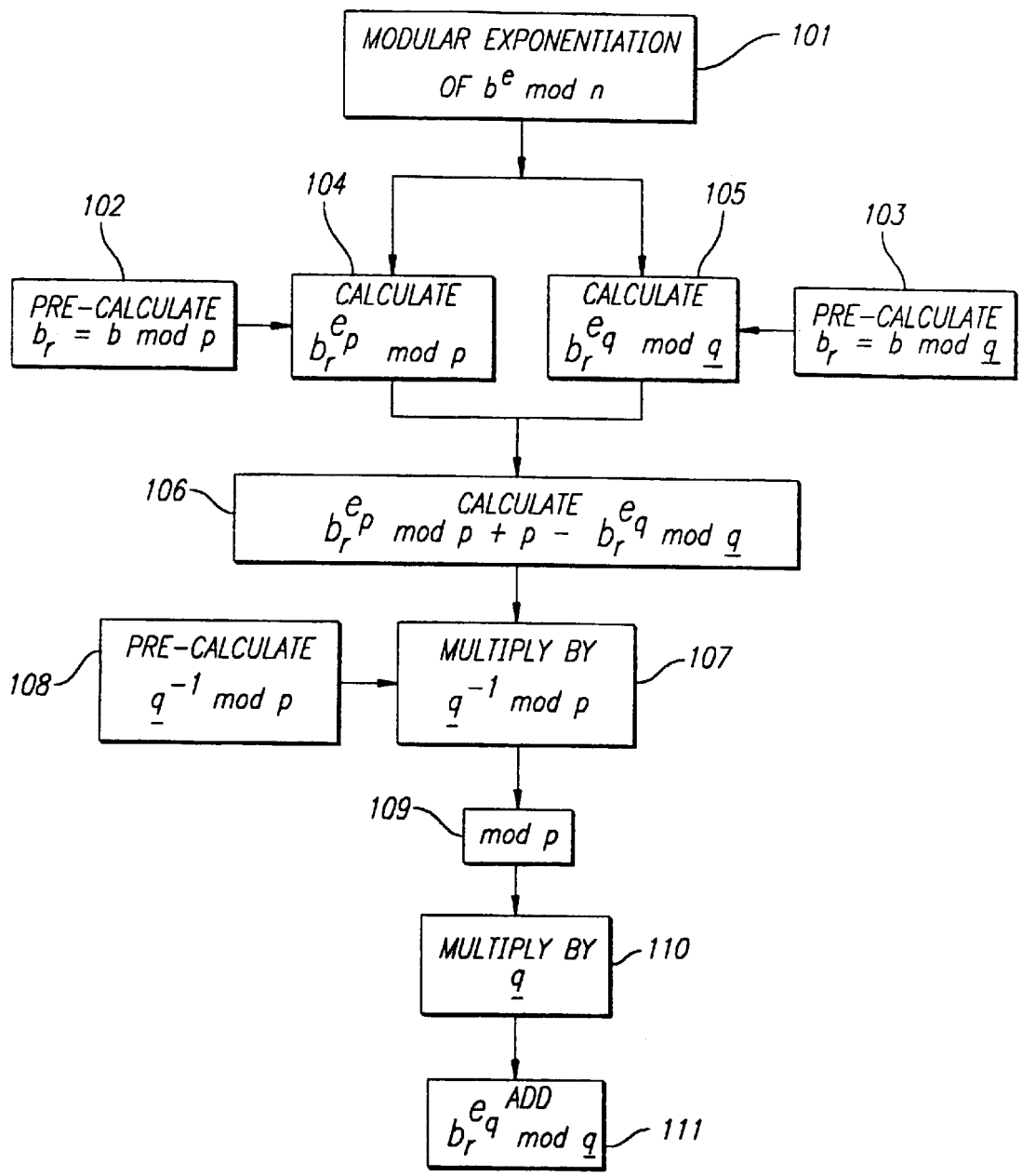
FIG. 3 is a system level flow diagram of the functions performed by the modular exponentiator.

Referring now to FIG. 3 in conjunction with FIG. 2 described above, a system level flow diagram of the functions performed by the modular exponentiator 20 is illustrated. As shown at step 101, the modular exponentiator 20 will compute a modular exponentiation of the form $y=b^e$ mod n, in which the modulus n, base b and exponent e are each k bits long. In a preferred embodiment of the present invention, k is 1,024 bits. Using conventional methods, solving such a modular exponentiation would require a tremendous amount of computing power due to the large number and size of the multiplications and modular reductions that must be performed. In the present invention, the modular exponentiation is solved in a highly efficient manner by reducing the size of the problem and by reducing the number of multiplications that are performed.

As a first step in solving the modular exponentiation, the original exponentiation is split into components, as follows:

$$b^e \bmod n = (((q^{-1} \bmod p^* (b_r^{e_p} \bmod p + p - b_r^{e_q} \bmod q)) \bmod p)^*q) + b_r^{e_q} \bmod q$$

in which p and q are large prime numbers whereby $n=p^*q$. For maximum security, p and q should be roughly the same size. The term $q^{-1}$ mod p is a special value called an inverse which is derived from the Chinese remainder theorem, as known in the art. In particular, $q^{-1}$ mod p is the inverse of q mod p. Since the inverse represents a modular exponentiation of the same order as $b^{e_p}$ mod p, the inverse may be pre-calculated in advance, and stored in the RAM 25 at step 108. The values $e_p$ and $e_q$ are k/2 bit values equal to e mod (p−1) and e mod (q−1), respectively. A reduced base term $b_r$ for each of $b_r^{e_p}$ mod p and $b_r^{e_q}$ mod q is provided by taking a modular reduction of b with respect to p and q, respectively. The reduced base terms $b_r$ thus have a k/2 bit length as well.

Splitting the modular exponentiation permits its solution in two parallel paths, as illustrated in FIG. 3, which are processed separately by the respective processing units 24a, 24b of FIG. 2. At steps 104, 105, the modular exponentiations $b_r^{e_p}$ mod p and $b_r^{e_q}$ mod q are calculated separately using techniques that will be further described below. The $b_r$ terms of each of the two modular exponentiations may be pre-calculated in advance, and stored in the RAM 25 at steps 102, 103.

Since p and q are each respectively k/2 bits in length, the magnitude of the respective problems is thus reduced substantially from its original form. Moreover, the parallel calculation of two reduced-size modular exponentiations requires substantially less computer processing time than a corresponding calculation of the original modular exponentiation within a single processing unit. The reduction in processing time results from the fact that the number of multiplies needed to perform an exponentiation with an efficient algorithm (such as described below) is proportional to $2s^2+s$, where s is equal to k divided by the multiplication operand size in bits. If an s word problem was treated as two separate s/2 word problems, the number of multiply operations per exponentiation is reduced to a value proportional to $$\frac{s^2}{2} + \frac{s}{2}.$$

For example, if k were 1,024 bits and the multiplication operand were 128 bits, s would be equal to 8. Accordingly, an s word problem would require a number of multiply operations proportional to 136, while the two separate s/2 word problems would respectively require a number of multiply operations proportional to 36. Thus, the number of multiply operations is reduced by 3.778 times.

Following the calculations of steps 104, 105, the $b_r^{e_q}$ mod q term is subtracted from $b_r^{e_p}$ mod p, and the result is added to p at step 106. At step 107, the resulting sum is multiplied by the inverse $q^{-1}$ mod p which was pre-calculated at step 108. This step may be performed by one of the multipliers 28a, 28b, which are optimized for modular operations as will be further described below. The resulting product is modularly reduced with respect to p at step 109, and further multiplied by q at step 110 to produce a k-bit value. Lastly, the product of that final multiplication is added to $b_r^{e_q}$ mod q at step 111, which was previously calculated at step 105. It should be appreciated that the modular reduction that occurs at step 109 is much easier than the original modular exponentiation in view of the substantial reduction in size of the original $b^e$ term. This final solution to the modular exponentiation is provided to the data and control bus 18 for further use by the CPU 12.

Figure 4:
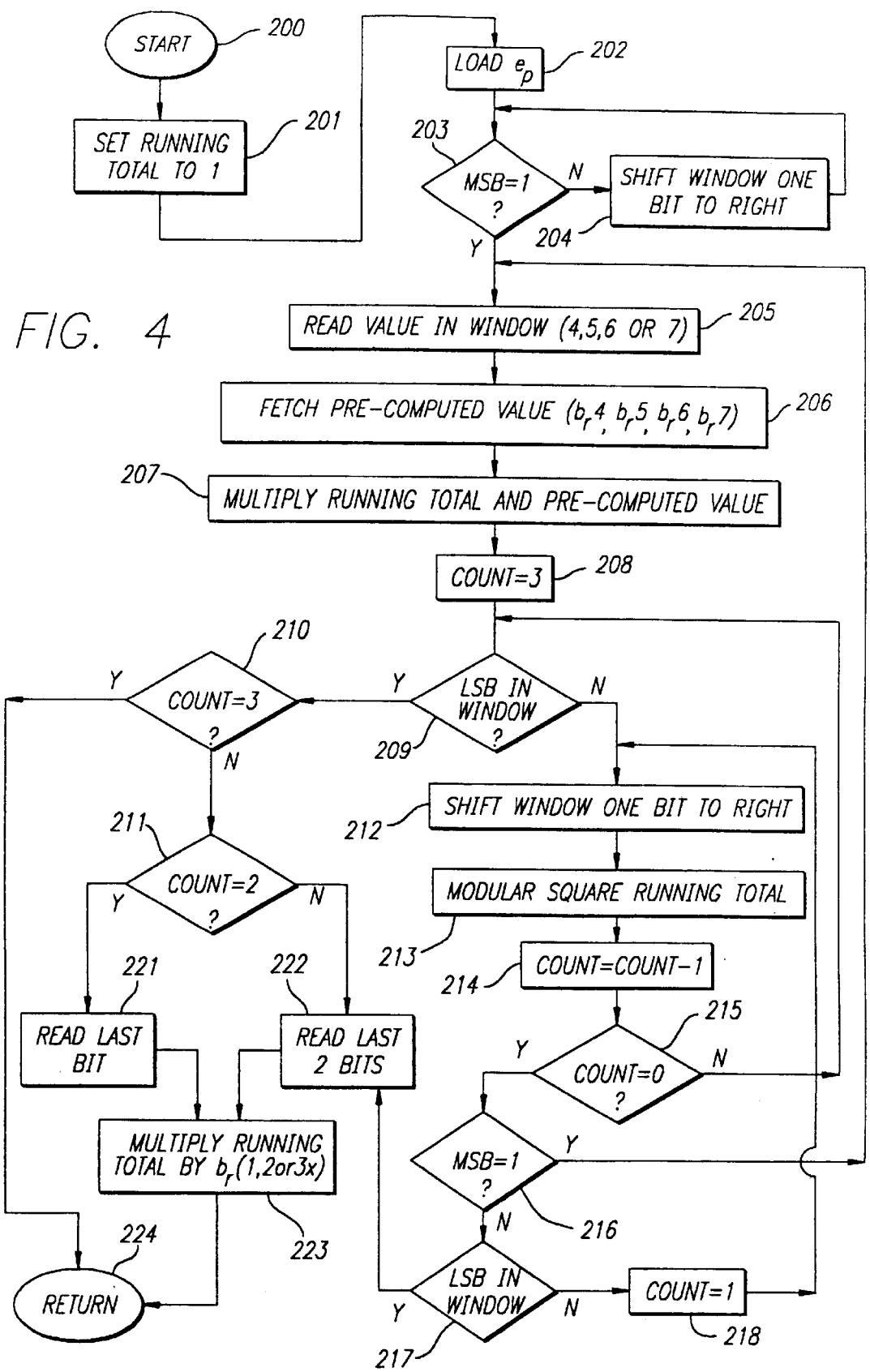
FIG. 4 is a flow chart showing an exponent bit scanning operation performed by the modular exponentiator.

Referring now to FIGS. 4 and 5a–c, the modular exponentiations of $b_r^{e_p}$ mod p and $b_r^{e_q}$ mod q from steps 104, 105 of FIG. 3 are shown in greater detail. Specifically, FIG. 4 illustrates a flow chart describing a routine referred to herein as exponent bit-scanning, which is used to reduce the number of multiplications necessary to perform an exponentiation. In general, the exponent bit-scanning routine factors the exponentials $b_r^{e_p}$ and $b_r^{e_q}$ into a product of precomputed powers of the reduced base $b_r$ modularly reduced with respect to p or q. The routine may be coded in firmware and executed sequentially by the respective processing units 24a, 24b described above in the form of a software program. Alternatively, the routine may be hardwired as discrete logic circuits that are optimized to perform the various functions of the exponent bit-scanning routine. For convenience, the description that follows will refer only to the operation of the exponent bit scanning routine with respect to the exponential $b_r^{e_p}$, but it should be appreciated that a similar operation must be performed with respect to the exponential $b_r^{e_q}$.

Figure 5A:
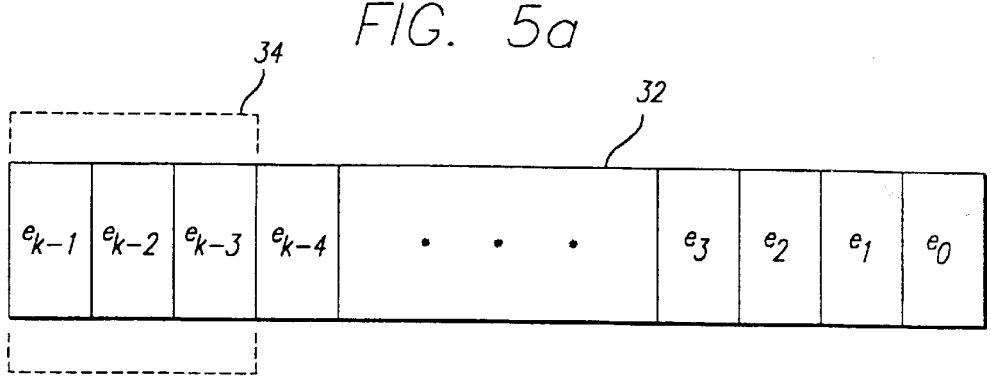
FIGS. 5a–c are block diagrams of an exponent register within various stages of the exponent bit scanning operation of FIG. 4.
Figure 5B:
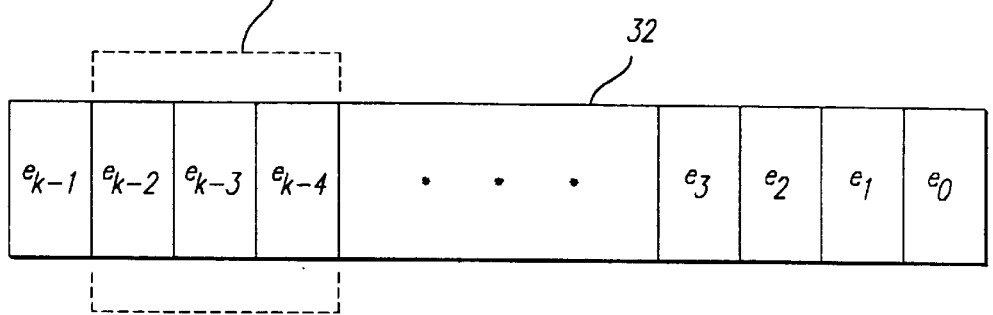
Figure 5C:
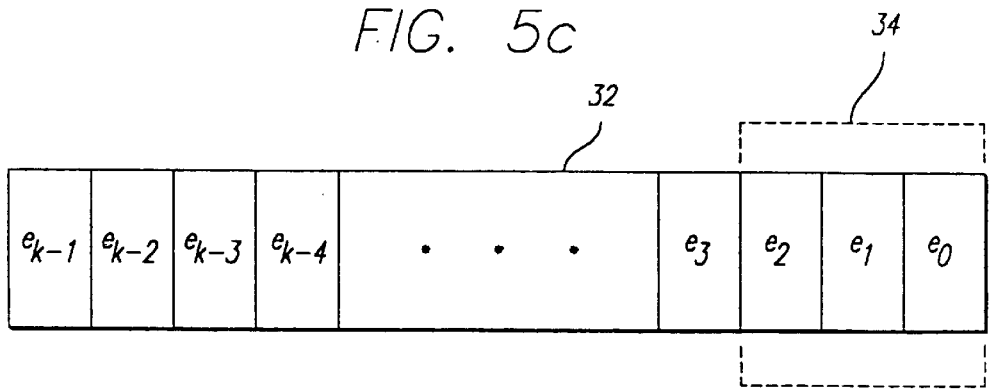

The exponent bit-scanning routine is called at step 200, and a running total is initialized to one at step 201. An exponent $e_p$ to be bit-scanned is loaded into a register at step 202. FIGS. 5a–c illustrate a k-bit exponent e (i.e., $e_{k-1}$–$e_o$) loaded into a register 32. The register 32 may comprise a predefined memory space within the RAM 25. First, a window 34 is defined through which a limited number of bits of the exponent e are accessed. A window size of three bits is used in an exemplary embodiment of the present invention, though it should be appreciated that a different number could also be advantageously utilized. The window 34 is shifted from the left of the register 32 until a one appears in the most significant bit (MSB) of the 3-bit window, as shown by a loop defined at steps 203 and 204. In step 203, the MSB is checked for presence of a one, and if a one is not detected, the window 34 is shifted by one bit to the right at step 204. FIG. 5b illustrates the window 34 shifted one bit to the right. It should be apparent that steps 203 and 204 will be repeated until a one is detected.

At step 205, a one has been detected at the MSB, and the value of the three-bit binary number in the window 34 is read. The number is necessarily a 4, 5, 6 or 7 (i.e., binary 100, 101, 110 or 111, respectively) since the MSB is one. At step 206, a pre-computed value for the reduced base $b_r$ raised to the number read from the window 34 (i.e., $b_r^4$, $b_r^5$, $b_r^6$ or $b_r^7$, respectively) is fetched from memory. This pre-computed value is multiplied by a running total of the exponentiation at step 207. It should be appreciated that in the first pass through the routine the running total is set to one as a default.

Thereafter, a loop begins at step 209 in which the register 32 is checked to see if the least significant bit (LSB) of the exponent $e_p$ has entered the window 34. Significantly, step 209 checks for the LSB of the entire exponent $e_p$, in contrast with step 203 which reads the MSB of the window 34. If the LSB has not yet entered the window 34, the loop continues to step 212 at which the window 34 is successively shifted to the right, and step 213 in which the running total is modular squared with each such shift. The loop is repeated three times until the previous three bits are no longer in the window 34, i.e., three shifts of the window. Once three shifts have occurred, the routine determines at step 216 whether the MSB is one. If so, the routine returns to step 205, and the value in the window 34 is read once again. Alternatively, if the MSB is zero, then the register 32 is again checked at step 217 to see if the LSB of the exponent $e_p$ has entered the window 34. If the LSB is not in the window 34, the loop including steps 212 and 213 is again repeated with the window again shifted one bit to the right and the running total modular squared with the shift.

If, at step 217, the LSB has entered the window 34, this indicates that the end of the exponent $e_p$ has been reached and the exponent bit-scanning routine is almost completed. At step 222, the last two bits in the window 34 are read, and at step 223 the running total is multiplied by the reduced base $b_r$ the number of times the value read in the window. For example, if the value of the lower two bits is a one, two, or three (i.e., binary 01, 10 or 11, respectively), then the previous running total is multiplied by the reduced base $b_r$ one, two or three times, respectively. If the value of the lower two bits is a 0, then the running total is not changed (i.e, multiplied by one). Then, the exponent bit-scanning routine ends at step 224.

Returning to step 209 discussed above, before the loop begins, the register 32 is checked to see if the LSB of the exponent $e_p$ has entered the window 34. If the LSB has entered the window 34, a series of step are performed in which the count value is checked. The count value keeps track of the number of passes through the above-described loop that have taken place. If the count value is three, indicating that all of the bits in the window 34 have been previously scanned, then the exponent bit-scanning routine ends at step 224. If the count value is two, then all but the last bit in the window 34 has been previously scanned, and at step 221, the value of the last bit is read. If the count value is one, then only the first bit in the window 34 has been previously scanned, and at step 222, the value of the last two bits is read (as already described above). Once again, at step 223 the running total is multiplied by the reduced base $b_r$ the number of times the value read in the window. Then, the exponent bit-scanning routine ends at step 224.

Figures 7, 8:
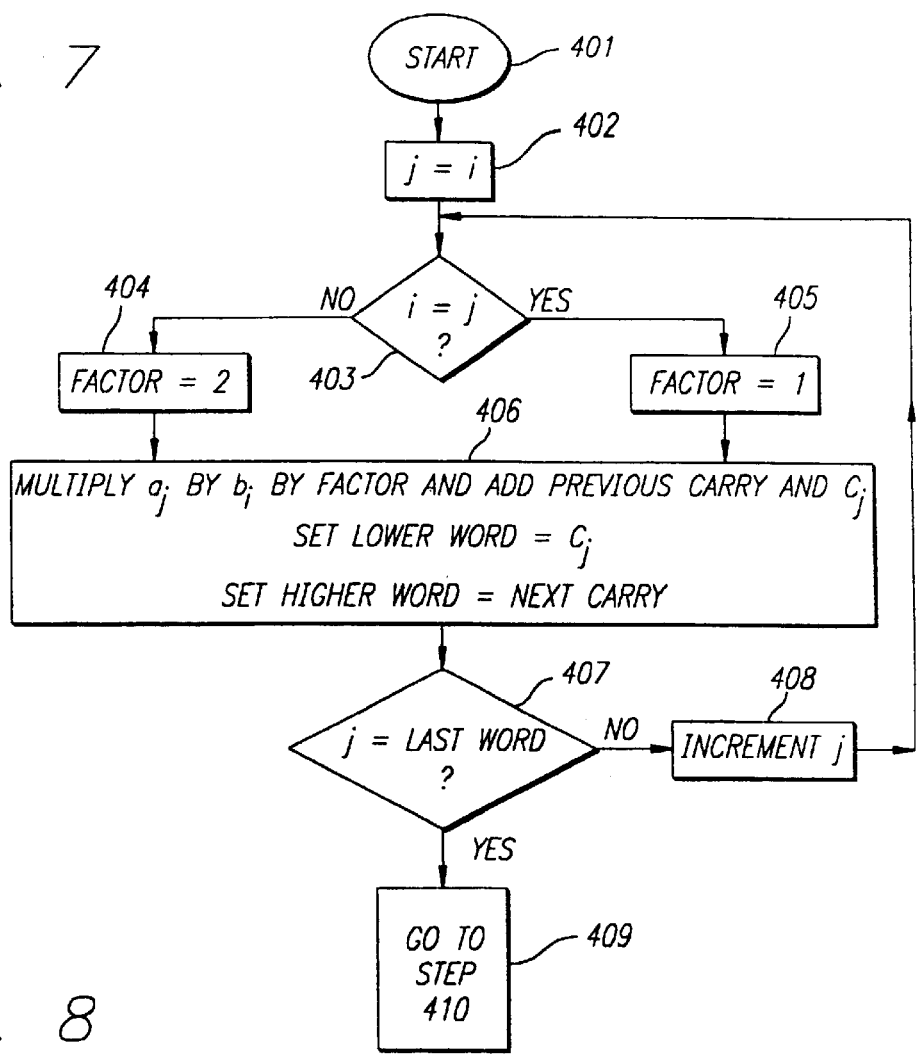
FIG. 7 is a flow chart showing a squaring operation performed in conjunction with the multiplication operation of FIG. 6.
FIG. 8 is a chart showing an exemplary exponent bit scanning operation in accordance with the flow chart of FIG. 4.

An example of the exponent bit-scanning technique is illustrated in FIG. 8 with respect to a modular exponentiation of a base b raised to a ten-bit exponent e, in which e=1011010011. The successive shifts reduce the exemplary term $b^{1011010011}$ to $((((((b^5)^2)^2)^2)*b^5)^2)^2)^2*b^3$. Since the term $b^5$ was precalculated and fetched from memory, processing time is saved by not having to calculate that term. In addition, there are additional processing time savings that are achieved in performing a modular reduction of the exemplary term with respect to n due to the distributive nature of modular reduction. Rather than a huge number of multiplications followed by an equally huge modular reduction, only nine multiplications and modular reductions are required, and the modular reductions are smaller in magnitude since the intermediate values are smaller.

It should be appreciated that the modular squaring step that occurs with each shift is necessary since the exponent bit-scanning begins at the MSB of the exponent $e_p$ where the window value is not really 4, 5, 6 or 7, but is actually 4, 5, 6 or 7 times $2^k$ where k is the exponent bit position for the window's LSB bit. Since the value of the exponent $e_p$ is interpreted as a power of the base $b_r$, a factor of $2^k$ implies squaring k times. Multiplying by a precalculated value when the window MSB is one is used to insure that all ones in the exponent $e_p$ are taken into account and to reduce the total number of pre-calculated values that are needed.

Even though the exponent bit-scanning routine has reduced the number of multiplications that have to be performed in the respective calculations of $b_r^{e_p}$ mod p and $b_r^{e_q}$ mod q, there still are a number of multiplications that need to be performed. The modular exponentiator 20 utilizes an efficient multiplication algorithm for modular terms, referred to in the art as Montgomery multiplication. The Montgomery algorithm provides that:

$$Mont(a, b) = \frac{(a*b)}{2^k} \mod n$$

where k is the number of bits in the modulus n, n is relatively prime to $2^k$, and n>a, n>b. In order to use the algorithm for repeated multiplies, the values of a and b must be put into Montgomery form prior to performing the Montgomery multiply, where:

$$x*2^k \mod n = X_{Mont}$$

If the two values to be Montgomery multiplied are in Montgomery form, then the result will also be in Montgomery form.

Figure 6:
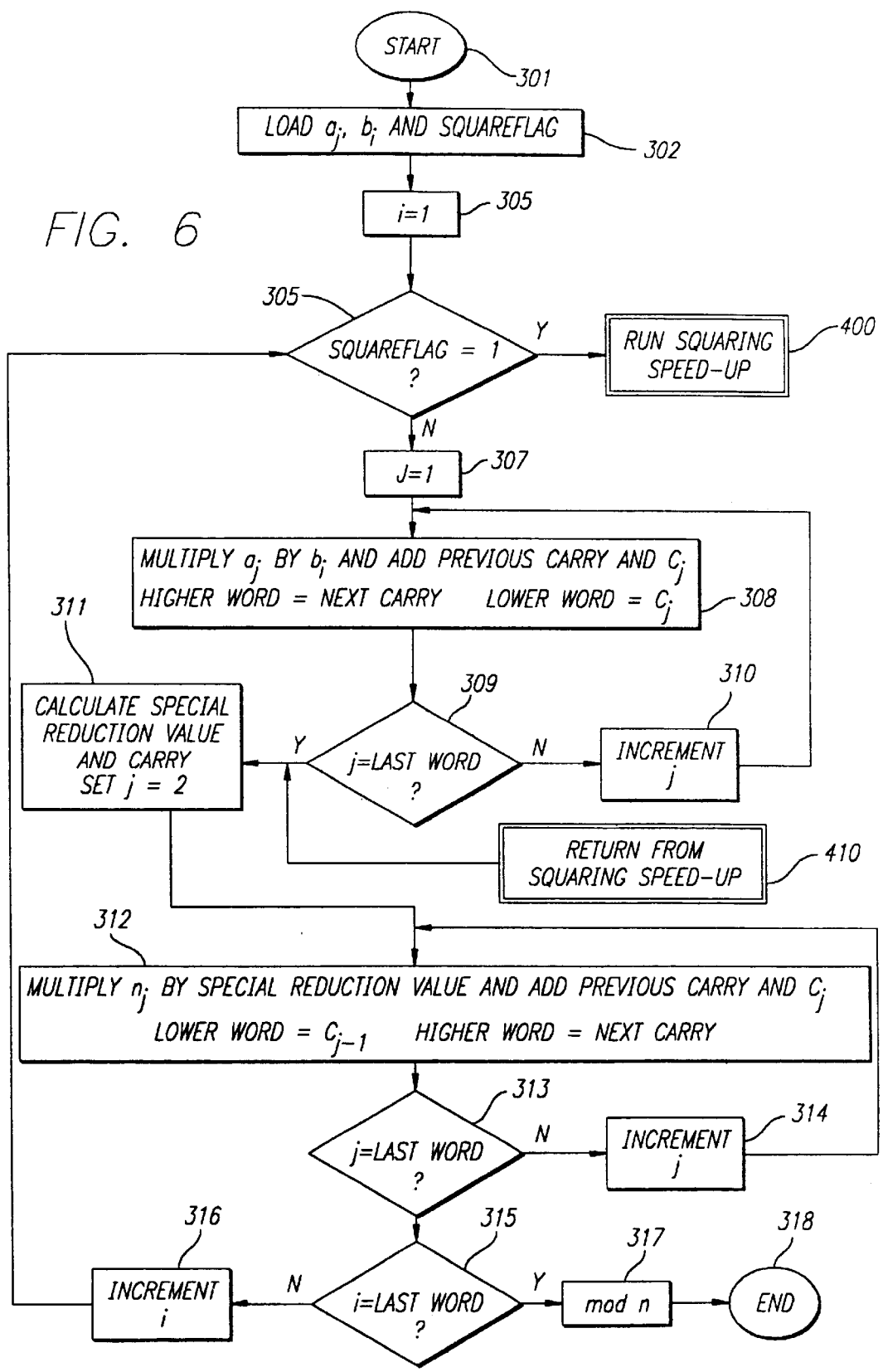
FIG. 6 is a flow chart showing a multiplication operation performed by the modular exponentiator.

FIG. 6 illustrates a flow chart describing a Montgomery multiplication operation executed by the modular exponentiator 20. As with the exponent bit-scanning routine described above with respect to FIG. 4, the Montgomery multiplication operation may be coded in firmware and executed sequentially within the respective processing units 24a, 24b by the control units 26a, 26b which access the multipliers 28a, 28b for particular aspects of the operation, as will be further described below. Alternatively, the Montgomery multiplication routine may be hardwired as discrete logic circuits that are optimized to perform the various functions of the routine.

As illustrated in FIG. 6, the Montgomery multiplication routine includes a major loop and two minor loops. In each major loop, a distinct word of a multiplicand $b_i$ is multiplied by each of the words of a multiplicand $a_j$, where j is the number of words in multiplicand $a_j$ and i is the number of words in multiplicand $b_i$. The Montgomery multiplication routine is called at step 301. The two multiplicands $a_j$ and $b_i$ are loaded into respective registers at step 302, along with a square flag. If the two multiplicands $a_j$ and $b_i$ are equal, the square flag is set to one so that a squaring speed-up subroutine may be called at step 400. The squaring speed-up subroutine will be described in greater detail below. If the two multiplicands $a_j$ and $b_i$ are not equal, then the square flag is set to zero.

Before initiating the first major loop, i is set to be equal to one at step 305 so that the first word of multiplicand $b_i$ is accessed. The square flag is checked at step 306 to determine whether the squaring speed-up subroutine should be called, and if not, j is set equal to one at step 307. The two words $a_j$ and $b_i$ are multiplied together within the first minor loop at step 308, and the product added to the previous carry and previous $c_j$. It should be appreciated that in the first pass through the routine, the carry and $c_j$ values are zero. The lower word of the result is stored as $c_j$ and the higher word of the result is used as the next carry. The first minor loop is repeated by incrementing j at step 310 until the last word of $a_j$ is detected at step 309, which ends the first minor loop. Before starting the second minor loop, a special reduction value is calculated that produces all "0"s for the lowest word of $c_j$ when multiplied with $c_j$, and j is set to two at step 311. Thereafter, at step 312, the special reduction value is multiplied by the modulus $n_j$, and added to the previous carry and $c_j$. The lower word of the result is stored as $c_{j-1}$ and the higher word of the result is used as the next carry. The second minor loop is repeated by incrementing j at step 314 until the last word of $c_j$ is detected at step 313, which ends the second minor loop. Once the second minor loop ends, i is incremented at step 316 and the major loop is repeated until the last word of $b_i$ has passed through the major loop. Then, the modular reduction of the final result of $c_j$ with respect to n is obtained at step 317, and the Montgomery multiplication routine ends at step 318. An example of a Montgomery multiplication of $a_j$ with $b_i$ in which both multiplicands are four words long is provided at FIG. 9. In the example, the symbol $\Sigma$ is used to denote the combination of all previous values.

The Montgomery multiplication routine of FIG. 6 can be speeded up when used to square a number by recognizing that some of the partial products of the multiplication are equal. In particular, when multiplicand $a_j$ is equal to multiplicand $b_i$, i.e., a squaring operation, then the partial products of various components of the multiplication would ordinarily be repeated, e.g., the partial product of $a_2$ with $b_3$ is equal to the partial product of $a_3$ with $b_2$. As illustrated in FIG. 9, both of these partial products occur during the third major loop iteration. Thus, the first time the partial product is encountered it can be multiplied by two to account for the second occurrence, and a full multiplication of the second partial product can be skipped. Multiplication by two constitutes a single left shift for a binary number, and is significantly faster than a full multiplication operation. It should be appreciated that a great number of squaring operations are performed by the modular exponentiator 20 due to the operation of the exponent bit-scanning routing described above, and an increase in speed of the squaring operations would have a significant effect on the overall processing time for a particular modular exponentiation.

FIG. 7 illustrates a flow chart describing the squaring speed-up subroutine, which is called at step 401. Initially, j is set to be equal to i at step 402, which, in the first iteration of the major loop of FIG. 6, will be equal to one. In subsequent iterations of the major loop, however, it should be apparent that j will begin with the latest value of i and will thus skip formation of partial products that have already been encountered. At step 403, i is compared to j. If i is equal to j, then at step 405 a factor is set to one, and if i and j are not equal, then at step 404 the factor is set to two. Thereafter, in step 406, $a_j$ and $b_i$ and the factor are multiplied together and the product added to the previous carry and $c_j$. As in step 308 of FIG. 6, the lower word of the result is stored as $c_j$ and the higher word of the result is used as the next carry. After completing the multiplication step 406, j is incremented at step 408 and the loop is repeated until the last word of $b_j$ has passed through the loop, at which time the squaring speed-up subroutine ends at step 409. At step 410 of FIG. 6, the Montgomery multiplication routine resumes just after the first minor loop. It should be appreciated that the squaring speed-up subroutine will operate in place of the first minor loop for every iteration of the major loop of the Montgomery multiplication routine when the squaring flag is set.

In order to perform the Montgomery multiplication routine more efficiently, the multipliers 28a, 28b are tailored to perform specific operations. In particular, the multipliers 28a, 28b include specific functions for multiplying by two (used by the squaring speed-up routine), executing an a*b+c function, and performing the mod $2^n$ function on a 2n-bit result while leaving the higher n bits in a carry register. The implementation of such tailored functionality for a multiplier device is considered to be well known in the art.

Having thus described a preferred embodiment of a high speed modular exponentiator, it should be apparent to those skilled in the art that certain advantages of the within system have been achieved. It should also be appreciated that various modifications, adaptations, and alternative embodiments thereof may be made within the scope and spirit of the present invention. The invention is further defined by the following claims.

What is claimed is:

1. In a system comprising at least one processing unit adapted to receive a first communicated signal and derive a cryptographic key therefrom with improved computational efficiency by computation of a modular exponentiation of the form $b^e$ mod n based on said first signal, an apparatus comprises:

means for dividing said modular exponentiation into at least first and second portions respectively having reduced modulus values p and q which are each smaller than an original modulus value n of said modular exponentiation, and a respective reduced base value $b_r$ which is smaller than an original base value b;

means for factoring each said portion of said modular exponentiation into respective pluralities of smaller modular exponentiations using precalculated exponent values;

means for multiplying said respective pluralities of smaller modular exponentiations together to provide respective first level intermediate products, said multiplying means being optimized for squaring operations;

means for combining said intermediate products into a final modular exponentiation product, and means using the final modular exponentiation product as a cryptographic key.

2. The apparatus of claim 1, wherein said first portion of said modular exponentiation comprises a component $b_r^{e_p}$ mod p and said second portion of said modular exponentiation comprises a component $b_r^{e_q}$ mod q in which p and q are prime numbers having a product equal to n.

3. The apparatus of claim 2, wherein p and q are of approximately equivalent magnitude.

4. The apparatus of claim 2, wherein said reduced base value $b_r$, said component $b_r^{e_p}$ mod p is pre-calculated from b mod p.

5. The apparatus of claim 2, wherein said reduced base value $b_r$ of said component $b_r^{e_q}$ mod q is pre-calculated from b mod q.

6. The apparatus of claim 1, wherein said combining means further comprises:

means for subtracting said respective intermediate products from each other and adding one of said reduced modulus values to provide a net sum value;

means for multiplying said net sum value with a precalculated inverse value to provide a second level intermediate product;

means for calculating a modular reduction of said net sum value with respect to said one of said reduced modulus values;

means for multiplying said modular reduction of said net sum value with the other one of said reduced modulus values; and means for adding one of said modular exponentiation portions to said second level intermediate product.

7. The apparatus of claim 1, wherein said precalculated inverse value is of the form $q^{-1}$ mod p.

8. The apparatus of claim 1, wherein said factoring means further comprises means for executing an exponent bit-scanning process.

9. The apparatus of claim 1, wherein said factoring means further comprises at least one register and means for loading an exponent e of one of said portions of said modular exponentiation into said register, said register further comprising a shiftable window of a size substantially less than a corresponding size of said register.

10. The apparatus of claim 9, wherein said factoring means further comprises means for selecting a pre-computed value comprising b raised to a selected exponent equivalent to a portion of exponent e read through said window.

11. The apparatus of claim 10, wherein said factoring means further comprises means for modular squaring said pre-computed value a number of times corresponding to successive bit shifts of said window relative to said exponent e.

12. The apparatus of claim 1, wherein said multiplying means further comprises means for executing a Montgomery multiplication process.

13. The apparatus of claim 1, wherein said multiplying means further comprises means for determining whether a particular multiplication of said respective pluralities of smaller modular exponentiations further comprises a squaring operation.

14. The apparatus of claim 13, wherein said multiplying means further comprises means for selectively reducing a total number of partial products of said particular multiplication when said multiplication comprises a squaring operation.

15. The apparatus of claim 1, wherein said multiplying means further comprises a multiplier optimized to perform a modular squaring operation.

16. A method for computing a cryptographic key with improved computational efficiency, based on a modular exponentiation of the form $b^e$ mod n comprises the steps of:

dividing said modular exponentiation into at least first and second portions respectively having reduced modulus values p and q, and a reduced base value $b_r$, than an original modulus value n and base value b of said modular exponentiation;

factoring each portion of said modular exponentiation into respective pluralities of smaller modular exponentiations having precalculated exponent values;

multiplying said respective pluralities of smaller modular exponentiations together to provide respective first level intermediate products, said multiplying step further comprising selectively reducing a total number of operations of said multiplying step for squaring of said respective pluralities of smaller modular exponentiations;

subtracting said respective intermediate products from each other and adding one of said reduced modulus values to provide an intermediate sum value;

multiplying said intermediate sum value with a precalculated inverse value to provide a second level intermediate product;

calculating a modular reduction of said second level intermediate product with respect to one of said reduced modulus values;

multiplying said modular reduction of said second level intermediate product with the other one of said reduced modulus values;

adding one of said first and second modular exponentiation portions to said second level intermediate product to provide a final modular exponentiation product; and employing the final modular exponentiation product to define said cryptographic key.

17. The method of claim 16, wherein said first portion of said modular exponentiation comprises a component $b_r^{e_p}$ mod p and said second portion of said modular exponentiation comprises a component $b_r^{e_q}$ mod q in which p and q are prime numbers having a product equal to n.

18. The method of claim 16, wherein p and q are of approximately equivalent magnitude.

19. The method of claim 17, wherein said reduced base value $b_r$ of said component $b_r^{e_p}$ mod p is pre-calculated from b mod p.

20. The method of claim 17, wherein said reduced base value $b_r$ of said component $b_r^{e_q}$ mod q is pre-calculated from b mod q.

21. The method of claim 16, wherein said precalculated inverse value is of the form $q^{-1}$ mod p.

22. The method of claim 16, wherein said factoring step further comprises executing an exponent bit-scanning process.

23. The method of claim 16, wherein said factoring step further comprises loading an exponent e of one of said portions of said modular exponentiation into a register, said register further comprising a shiftable window of a size substantially less than a corresponding size of said register.

24. The method of claim 23, wherein said factoring step further comprises selecting a pre-computed value comprising b raised to a selected exponent equivalent to a portion of exponent e read through said window.

25. The method of claim 24, wherein said factoring step further comprises modular squaring said pre-computed value a number of times corresponding to successive bit shifts of said window relative to said exponent e.

26. The method of claim 16, wherein said multiplying step further comprises executing a Montgomery multiplication process.

27. The method of claim 16, wherein said multiplying step further comprises determining whether a particular multiplication of said respective pluralities of smaller modular exponentiations further comprises a squaring operation.

28. The method of claim 27, wherein said multiplying step further comprises selectively reducing a total number of partial products of said particular multiplication when said multiplication comprises a squaring operation.

29. A method of decrypting data encrypted with an encryption key, wherein a decryption key is provided by computation of a modular exponentiation of the form $b^e$ mod n based on the encryption key, comprising:

dividing said modular exponentiation into at least first and second portions respectively having reduced modulus values p and q, and a reduced base value $b_r$, than an original modulus value n and base value b of said modular exponentiation;

factoring each portion of said modular exponentiation into respective pluralities of smaller modular exponentiations having precalculated exponent values;

multiplying said respective pluralities of smaller modular exponentiations together to provide respective first level intermediate products, said multiplying step further comprising selectively reducing a total number of operations of said multiplying step for squaring of said respective pluralities of smaller modular exponentiations;

subtracting said respective intermediate products from each other and adding one of said reduced modulus values to provide an intermediate sum value;

multiplying said intermediate sum value with a precalculated inverse value to provide a second level intermediate product;

calculating a modular reduction of said second level intermediate product with respect to one of said reduced modulus values;

multiplying said modular reduction of said second level intermediate product with the other one of said reduced modulus values; and adding one of said first and second modular exponentiation portions to said second level intermediate product to provide a final modular exponentiation product; and employing the final modular exponentiation product to define said cryptographic key.

30. A method as recited in claim 29, further comprising the step of receiving said encrypted data over a communications channel.

31. A method as recited in claim 29, further comprising the step of receiving encrypted data and said encryption key over a communications channel.

32. The method of claim 29, wherein said first portion of said modular exponentiation comprises a component $b_r^{ep}$ mod p and said second portion of said modular exponentiation comprises a component $b_r^{eq}$ mod q in which p and q are prime numbers having a product equal to n.

33. The method of claim 29, wherein said factoring step further comprises loading an exponent e of one of said portions of said modular exponentiation into a register, said register further comprising a shiftable window of a size substantially less than a corresponding size of said register.

34. The method of claim 33, wherein said factoring step further comprises selecting a pre-computed value comprising b raised to a selected exponent equivalent to a portion of exponent e read through said window.

35. The method of claim 34, wherein said factoring step further comprises modular squaring said pre-computed value a number of times corresponding to successive bit shifts of said window relative to said exponent e.

36. The method of claim 29, wherein said multiplying step further comprises executing a Montgomery multiplication process.

37. A system for decrypting data encrypted with an encryption key, wherein a decryption key is provided by computation of a modular exponentiation of the form $b^e$ mod n based on the encryption key, comprising:

means for dividing said modular exponentiation into at least first and second portions respectively having respective reduced modulus values p and q which are each smaller than an original modulus value n of said modular exponentiation, and a respective reduced base value $b_i$ which is smaller than an original vase value b;

means for factoring each said portion of said modular exponentiation into respective pluralities of smaller modular exponentiations using precalculated exponent values;

means for multiplying said respective pluralities of smaller modular exponentiations together to provide respective first level intermediate products, said multiplying means being optimized for squaring operations;

means for combining said intermediate products into a final modular exponentiation product, and a processor unit coupled to receive said final modular exponentiation product and define said decryption key based on the final modular exponentiation product, said processing unit including means for decrypting said encrypted data using said decryption key.

38. A system as recited in claim 37, further comprising means for receiving said encrypted data over a communications channel.

39. A system as recited in claim 37, further comprising means for receiving encrypted data and said encryption key over a communications channel.

40. The apparatus of claim 37, wherein said first portion of said modular exponentiation comprises a component $b_f^{ep}$ mod p and said second portion of said modular exponentiation comprises a component $b_f^{eq}$ mod q in which p and q are prime numbers having a product equal to n.

41. The apparatus of claim 37, wherein said factoring means further comprises at least one register and means for loading an exponent e of one of said portions of said modular exponentiation into said register, said register further comprising a shiftable window of a size substantially less than a corresponding size of said register.

42. The apparatus of claim 41, wherein said factoring means further comprises means for selecting a pre-computed value comprising b raised to a selected exponent equivalent to a portion of exponent e read through said window.

43. The apparatus of claim 42, wherein said factoring means further comprises means for modular squaring said pre-computed value a number of times corresponding to successive bit shifts of said window relative to said exponent e.

44. The apparatus of claim 37, wherein said multiplying means further comprises means for executing a Montgomery multiplication process.

* * * * *